March 13, 1928.  
L. CHOLLET  
MOTOR HORN  
Filed Feb. 7, 1925
1,662,363
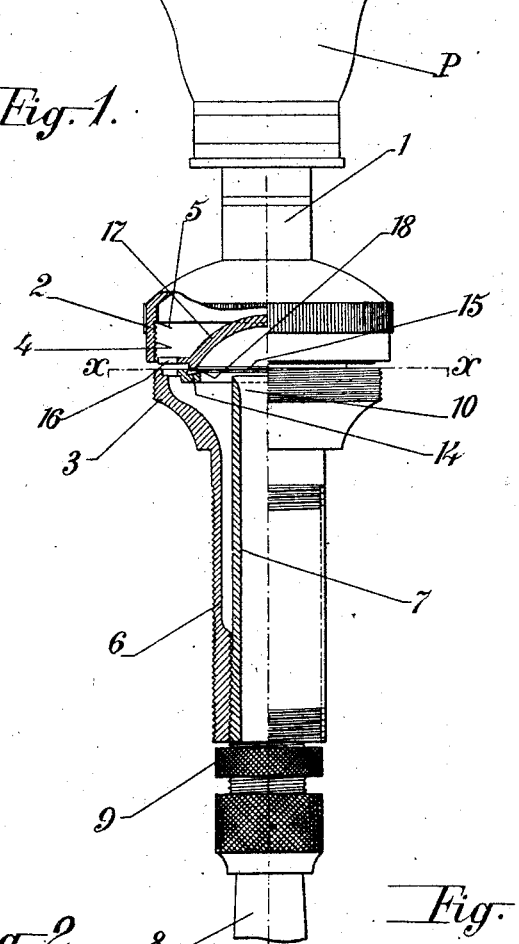
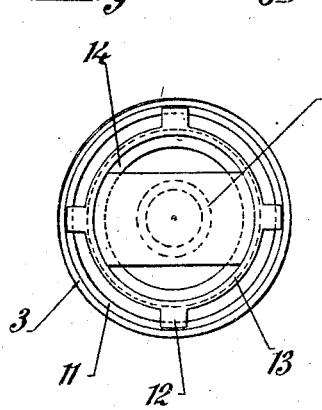
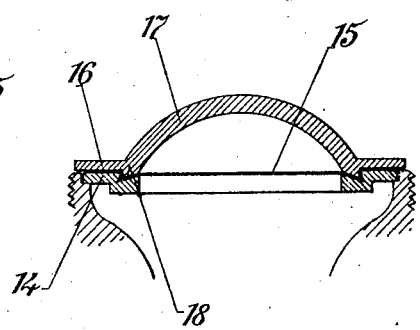
Louis Chollet, Inventor  
Attorneys Patented Mar. 13, 1928.

1,662,363

UNITED STATES PATENT OFFICE.

LOUIS CHOLLET, OF PARIS, FRANCE, ASSIGNOR TO COMPAGNIE INDUSTRIELLE ET COMMERCIALE DU CYCLE ET DE L'AUTOMOBILE, OF PARIS, FRANCE.

MOTOR HORN.

Application filed February 7, 1925, Serial No. 7,566, and in France February 8, 1924.

This invention has for its objects a horn in which the membrane can effectively be made to vibrate both by a low pressure of air produced by a bulb or piston and by air at comparatively high pressure produced by known means.

According to this invention the membrane is of such shape as to allow air to act on both faces thereof, while it is so carried as to give it a camber at its edges sloping towards the mouth of the horn or the edges of the membrane itself are cambered or these two cambers are combined.

The apparatus as applied to a bulb horn is illustrated in the accompanying drawings in which Figure 1 is a sectional elevation and Figure 2 a plan view on the line $x$—$x$, Fig. 3, is an enlarged sectional detail showing the sound-dome, membrane and supporting ledge.

As illustrated, the horn is sounded by a rubber bulb P or the like which may be operated by hand pressure by means of a lever, or by the foot, as in many existing systems.

The bulb P is mounted on a tube 1 connected to the cover 2 of a casing 3, and cover 2 is internally screw threaded at 4 and screws on to casing 3. The cover 2 has on it a shoulder 5 for securing the parts within casing 3.

The casing 3 is prolonged to form a tube 6 which is externally screw threaded for mounting the horn on a suitable part of the apparatus, on which it is to be used, by plates and screws, as in practice.

Within the tube 6 is a long tube 7 forming an extension of the horn piece 8, and 9 is a screw for locking tube 7 in tube 6 in any desired position. The bevelled end portion 10 of tube 7 forms the mouth of the horn piece and by adjusting the position of the tube 7 in the tube 6, the position of 10 relatively to a membrane can be varied.

Casing 3 has on it an internal rim 11 which supports tongues 12 carried by a ring 13. This ring itself has a beveled edge 14 on which is placed the edge of a vibrating membrane 15.

The air flows freely between the ring 13 and the body of the casing 3, in order to act under the vibrating membrane 15.

17 is a sound dome having on it three or four projections 16 which rest on the ring 13; dome 17 is bevelled at 18 inversely and to a greater degree than the bevel 14 on ring 13. When membrane 15 is in position and also dome 17, the cover 2 will, through its shoulder 5, exert pressure on projection 16, and therefore cause the cambering of the edges of membrane 15 between bevels 14 and 18, so stretching it and giving to it the necessary rigidity and elasticity.

When assembling the parts, tube 7 is screwed in the tube 6 till the position of maximum sound is found and is then secured by a nut 9. The apparatus is then ready for use. It will be found that this position is one in which mouth 10 does not, when the horn is sounded, come into contact with membrane 15 because the bulb, after it has sounded, immediately refills, as there is a free passage of air past membrane 15, thus no pressure or tension is exerted on the membrane.

If in reed instruments the bulb is pressed hard the excessive pressure of the air emitted therefrom causes the diaphragm to block the mouth of the horn. In this case, however, sound would be immediately emitted with great force as air from tube 1 passed through the space formed between the periphery of the ring 13 and the wall of casing 3, and so beneath membrane 15 where it would act with all its force; above the membrane the air expands slightly in dome 17 so that membrane 15 is raised in spite of the differences in the surfaces.

There is thus no possibility of blocking mouth 10 so rendering it superior to reed instruments, and moreover the strength of the sound given can vary from a sound suitable for town to a sound loud enough for the country.

It should be understood that if air is caused to pass into the casing from some continuous source of air such as a pump, the apparatus will give a continuous sound, as in other known instruments, but it only necessitates a small source of energy, since neither the blocking of the mouth-piece nor the tension of the membrane or spring has to be overcome.

The two feeds may be combined in which case the cover 2 has in addition a fitting for the air source as well as the tube 1, a non-return valve or the like being also provided so that when the bulb is used, the air from this will not expand in the channels of the air source but will pass through the membrane.

The membrane is preferably rectangular in shape and covers the mouth 10. Due to its particular thickness, the membrane provides a small space between the edges of the dome 17 and those of ring 13. This space allows the air to act above the membrane, in the same way as below the latter. If it was completely circular, the apparatus would be similar to those membrane apparatus already known; it would then be necessary to camber the membrane on to the mounth, and therefore to use a much greater air pressure.

The thickness and dimensions and so the weight of the membrane depend upon the tone of the instrument, i. e. the horn piece.

The tension produced by the bevels 14—18 may be increased by slightly cambering the edges of the membrane itself; moreover, the bevels 14—18 may be entirely done away with, but if so, the membrane must have its rim cambered. This membrane may be made of any material that can be so tensioned or cambered.

The casing may have a minimum diameter of 5 to 6 cm., and the membrane may be formed of a plate of 2 to 3 cm., by 1 cm.

Having now particularly described and ascertained the nature of our invention and in what manner the same is to be performed, we declare that what we claim is:—

1. In a horn, a tubular casing with an open upper end, a horn piece extension tube extending up into the casing, a membrane carrying ring mounted in the open end of the casing so that its rim is in spaced relation to the wall of the casing, a membraneous strip extending across the ring in proximity with the upper end of the extension tube and its width being less than the internal diameter of the ring, a sound dome mounted on the ring, and a cover extending over the open end of the casing, compressed air supplying means and means for directing the air from the compressed air supplying means onto both faces of the membraneous strip whereby such strip is vibrated.

2. A horn comprising a horn piece, an extension tube therefor, a tubular casing into which the extension tube extends, said casing being open at its top end, a cover for the open end of the casing, compressed air supplying means communicating with the interior of the casing, a membrane supported in the open end of the casing in proximity to the open end of the extension tube and so constructed as to permit the air to pass upwardly between such membrane and the wall of the casing, an imperforate sound dome supported above the membrane for preventing the downwardly moving air from impinging directly onto the upper surface of the membrane, said membrane being supported in such a manner that air spaces are constituted between its outer periphery and the wall of the casing, the air from the compressed air supplying means being deflected outwardly by the sound dome towards the air spaces between the sound dome and the wall of the casing, down through such air spaces, upwardly against the underneath face of the membrane and through the spaces between the membrane and casing wall against the sound dome whereby it is deflected onto the upper face of the membrane for vibrating it.

3. In a horn, a tubular casing with an open upper end, a horn piece extension tube extending up into the casing, a membrane carrying ring mounted in the open end of the casing so that its rim is in spaced relation to the wall of the casing, a membraneous strip extending across the ring in proximity with the upper end of the extension tube and its width being less than the internal diameter of the ring, a sound dome mounted on the ring, a cover extending over the open end of the casing, and means on the interior of the cover engaging the sound dome for securing it, the membrane supporting ring and the membraneous strip in position, compressed air supplying means and means for directing the air from the compressed air supplying means onto both faces of the membraneous strip whereby such strip is vibrated.

4. In a horn, a tubular casing having an open end, a membraneous strip supporting ring mounted in the open end of the casing, a membraneous strip mounted on the ring, said ring having a bevel upon which the ends of the membraneous strip rest, a sound dome having a bevel greater in degree than the bevel on the ring, and means coacting with the sound dome for pressing the bevel thereon downwardly into engagement with the ends of the membraneous strip.

5. In a horn, a tubular casing having an open end, a membrane supporting ring mounted in the open end of the casing, a membrane mounted on the ring, and means gripping the ends of the membrane for stretching it to the required tension.

6. In a horn, a tubular casing having an open end, a membrane supporting ring mounted in the open end of the casing, a member superimposed above the ring and coacting means on the ring and member gripping the membrane between them for stretching it to the required tension.

LOUIS CHOLLET.